(12) United States Patent
El Wardani et al.

(10) Patent No.: US 7,428,238 B2
(45) Date of Patent: Sep. 23, 2008

(54) BROADBAND NETWORK BRIDGING VARIOUS WIRING CHANNELS

(75) Inventors: Ladd El Wardani, La Jolla, CA (US); Itzhak Gurantz, San Diego, CA (US); Anton Monk, San Diego, CA (US); Brett Bernath, San Diego, CA (US); Michael Landry, San Diego, CA (US)

(73) Assignee: Entropic Communications Inc., San Diego, CA (US)

( * ) Notice: Subject to any disclaimer, the term of this patent is extended or adjusted under 35 U.S.C. 154(b) by 1141 days.

(21) Appl. No.: 10/215,609

(22) Filed: Aug. 9, 2002

(65) Prior Publication Data

US 2003/0031191 A1   Feb. 13, 2003

Related U.S. Application Data

(60) Provisional application No. 60/311,746, filed on Aug. 11, 2001.

(51) Int. Cl.
*H04L 12/28* (2006.01)

(52) U.S. Cl. .................. 370/401; 370/402; 370/464
(58) Field of Classification Search .............. None
See application file for complete search history.

(56) References Cited

U.S. PATENT DOCUMENTS

| 4,420,831 | A | * | 12/1983 | Hackett | 370/481 |
| 5,262,883 | A | * | 11/1993 | Pidgeon | 398/71 |
| 5,528,582 | A | * | 6/1996 | Bodeep et al. | 370/276 |
| 5,809,395 | A | * | 9/1998 | Hamilton-Piercy et al. | 725/106 |
| 6,587,479 | B1 | * | 7/2003 | Bianchi et al. | 370/487 |

* cited by examiner

*Primary Examiner*—Chi H. Pham
*Assistant Examiner*—Phuc Tran
(74) *Attorney, Agent, or Firm*—Michael W. Landry; Bruce W. Greenhaus (57) ABSTRACT

A network utilizing two or more wiring systems with a bridging function to provide a signal interconnect for communication within and between wiring systems. The bridging function can translate the network signals to a different frequency.

3 Claims, 11 Drawing Sheets

BROADBAND NETWORK BRIDGING VARIOUS WIRING CHANNELS

This application claims priority to U.S. provisional patent application No. 60/311,746 filed Aug. 11, 2001 entitled "Broadband Network Using Various Wiring Channels".

Related applications: Ser. No. 09/910,412 "Network interface and broadband local area network using coaxial cable" filed Jul. 21, 2001.

TECHNICAL FIELD

The present invention relates to broadband networks and specifically to networks transmitted on coaxial cable wiring used for video services.

BACKGROUND

Homes, offices, multiple dwelling units (MDUs), and other buildings are wired with coaxial cable and category 5 (CAT5) wire for video and data communications. A building may have more than one wiring system using coaxial cable, for example when service is obtained from a local cable TV provider and a direct broadcast satellite (DBS or SAT) provider. Cable TV signals distributed over coax are analog TV channels at 6 MHz spacing along with digital TV channels using specific 6 MHz bands. The frequency band used by a typical cable or community aerial TV (CATV) system is 5 to 860 MHz, including 5 to 55 MHz used for a reverse channel with cable modems. The coax wiring for a DBS system routes an L band signal comprised of several transponder signals, typically in the range of 950 to 1450 MHz, from an outdoor antenna and low noise block converter (LNB) into the building to integrated receiver/decoders (IRD). The IRD demodulates and decodes the digitally broadcast video signals and then outputs the signal to a TV monitor either at RF channel 3 or 4, or as composite or component analog video.

Category 5 twisted pair (CAT5) wiring is commonly used for data networking between computers, printers, and modems. CAT5 wiring may be wired in the building to wall outlets or user installed cable connecting between devices directly. A network hub or switch provides a physical junction between cables connecting to devices. These networks generally comply with IEEE-802.3, commonly referred to as Ethernet local area network (LAN). Ethernet also operates on coaxial cable. Fiber optic cable, IEEE-1394, and Universal Serial Bus (USB) each specify a wire and cable standard for interconnecting compatible devices.

Some buildings are wired with two sets of coaxial cable routed to each room. The use of each set of cable is determined by the user. One may be used for CATV and the other for SAT.

Customer premise equipment (CPE) such as IRDs and STBs connect to one of these wiring systems to receive or communicate signals. The systems operate independent of each other.

SUMMARY OF THE INVENTION

The present invention provides a signal bridge between a CATV and DBS wiring system to create a new data network to communicate information between network terminal devices attached to either wiring system. The terminal devices can utilize data from the network, video from the existing services, or both. Audio services can also utilize the network. Data from an existing CAT5 wiring system, such as 10/100 mbps Ethernet traffic can also be bridged to the coax wiring systems. Additionally, Wireless networks can be bridged to the coax wiring. One of the coaxial systems can be a Multipoint Microwave Distribution System (MMDS) service.

The bridging is accomplished by regenerating the signal from one wiring system onto the other wiring system with or without frequency translation. The signal can experience any level of processing before bridging. The bridging can occur with an RF signal, after demodulation, error correction, or protocol conversion. The bridge can perform routing functions where message addresses are recognized and bridged messages are selectively transmitted only on the portion of the network where the destination device is connected.

The bridging can also be accomplished by demodulating and decoding the data then recoding and modulating for transmission on the other wiring system. One feature of the invention is to present to the media access control (MAC) layer or link layer of the network communication protocol stack the appearance of a single physical layer. Devices connected to either wiring system are seen as part of a single unified network.

The present invention can be used by a DBS or CATV operator to use wiring present in a house that is otherwise unavailable to distribute video programming or other services. If a new service is installed it can utilize the cabling of an existing service. An end user can install bridging devices to enable network and video services to be delivered at any location with a coaxial outlet.

DETAILED DESCRIPTION OF THE INVENTION

Figure 1:
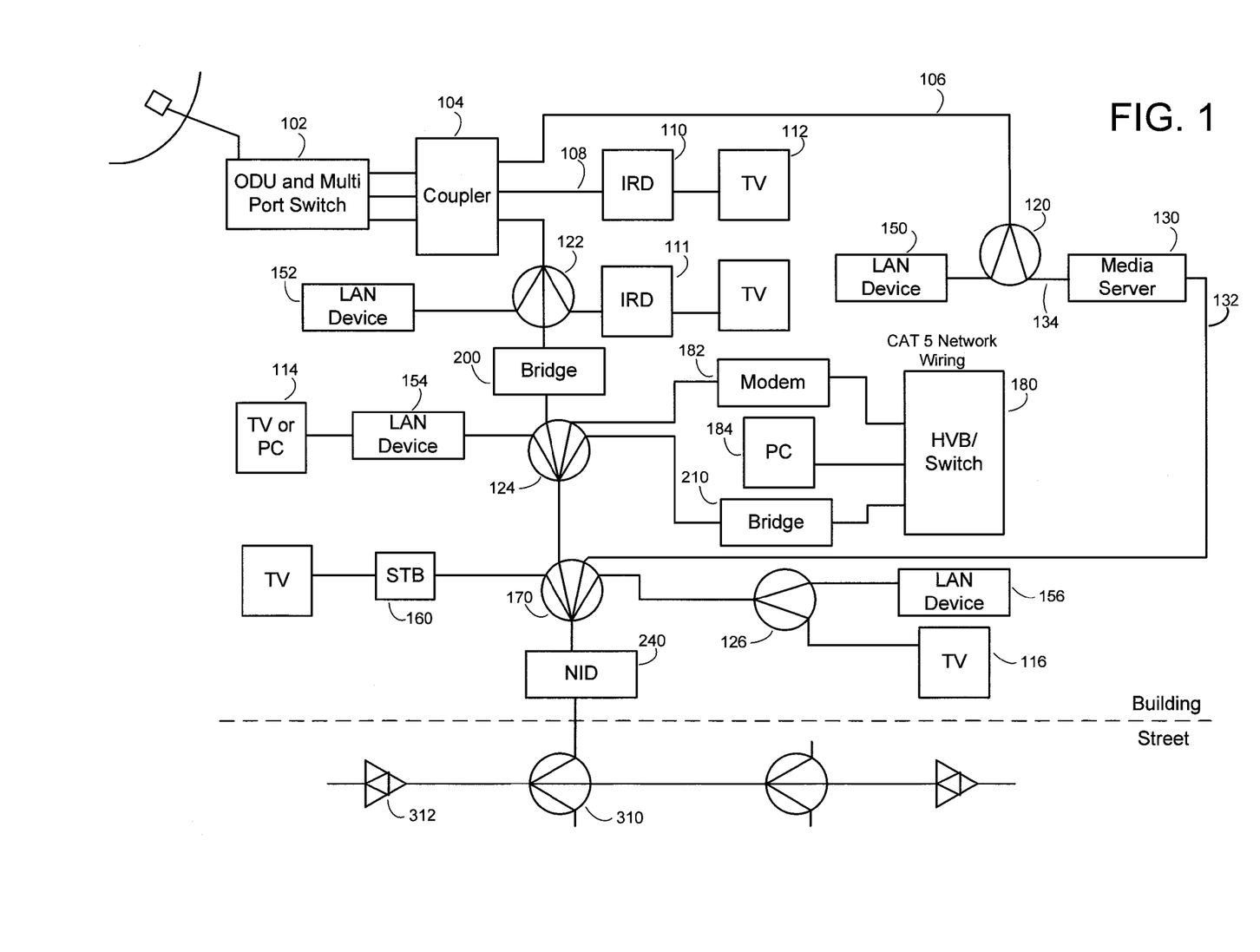
FIG. 1 is a diagram of a CATV, SAT, and CAT5 wiring system bridged in accordance with the present invention.

In FIG. 1, antenna and LNB(s) are part of an out door unit (ODU) 102 including a multiport switch and connect to coupler 104 to provide a signal from either polarization of any LNB to any one of the coax cables connected to an IRD. Coupler 104 provides a signal path between wiring branches, for example cable 106 and cable 108, in the SAT wiring system as described in co-pending application Ser. No. 09/910412 "Network interface and broadband local area network using coaxial cable", incorporated herein by reference. One or more IRDs 110 connect in the system to demodulate the DBS signal and provide a video signal to a television (TV) 112.

CATV wiring uses main splitter 170, which may be connected to the cable plant through a network interface device 240 to provide isolation, signal coupling, or some other function. The cable plant connection also, referred to as the root node, connects to tap 310 located outside the building, which is part of the cable plant distribution system including amplifiers 312. Cabling connected to main splitter 170 is routed through out the building to distribute the CATV signal.

Media server 130 may connect to the SAT wiring 134 and/or to the CATV wiring 132 and demodulates and decodes the programming from the respective system and produces a signal on the network frequency band. Media server 130 can perform local video programming storage of video programs received from either CATV or SAT systems and make the programs available to the other system. The signaling used can be at RF or baseband.

CATV and SAT wiring systems use directional couplers 120, 122, 124, 126, and 170 to distribute the signal to all the terminal devices. Directional couplers are also known as splitters or combiners. A terminal device can be a TV 116, a conventional cable set top box (STB) 160, and IRD 110, a cable modem 182, or a LAN device 156. LAN devices, or more generally network devices, 154, 152, 150, and 156 are able to communicate with each other using a network protocol. A LAN device can be integrated into an IRD or STB.

While directional couplers are not commonly used on SAT systems, a coupler that couples the DC control voltage from IRDs can be used. A directional coupler or splitter 122 capable of passing DC signaling enables the addition of a LAN device 152 at the location IRD 111 is connected to a coaxial wiring segment.

LAN devices receive, demodulate, and decode LAN data and encode, modulate, and transmit LAN data. LAN devices can use various forms of modulation, such as FM, QPSK, QAM, and OFDM. These are all well-known modulation types. The function of the LAN device is to interface the cable networked signals to a user device such as a PC or TV 114.

LAN devices can be connected in either wiring system. LAN devices 150 and 152 are connected in the SAT wiring. LAN devices 154 and 156 are connected in the CATV wiring and may be connected through additional splitter 124 and 126.

Repeater hub/switch 180 provides the interconnecting point for an Ethernet network, implemented with CAT5 wiring. Cable modem 182 and PC 184 communicate through hub 180.

A bridge 200 provides the mechanism to communicate signals generated on one wiring system to another wiring system. The bridge may connect at directional coupler taps present in each wiring system, bridging the RF signal. The bridge function may also be implemented by demodulating base band data from one wiring system and remodulating the data onto the other wiring system. Bridge 210 provides the communication path from the Ethernet network to the coaxial wiring network.

Network communication that is bridged between the wiring systems can be any digital protocol suitable for communication over a coaxial wiring channel. The bridged signal can also be analog or digital video channels.

Bridge 200 can be connected at a room or other location where the wiring of the two systems are in close proximity. It is common for at least one room to have a wall outlet with both CATV and SAT coaxial connection.

Figure 2:
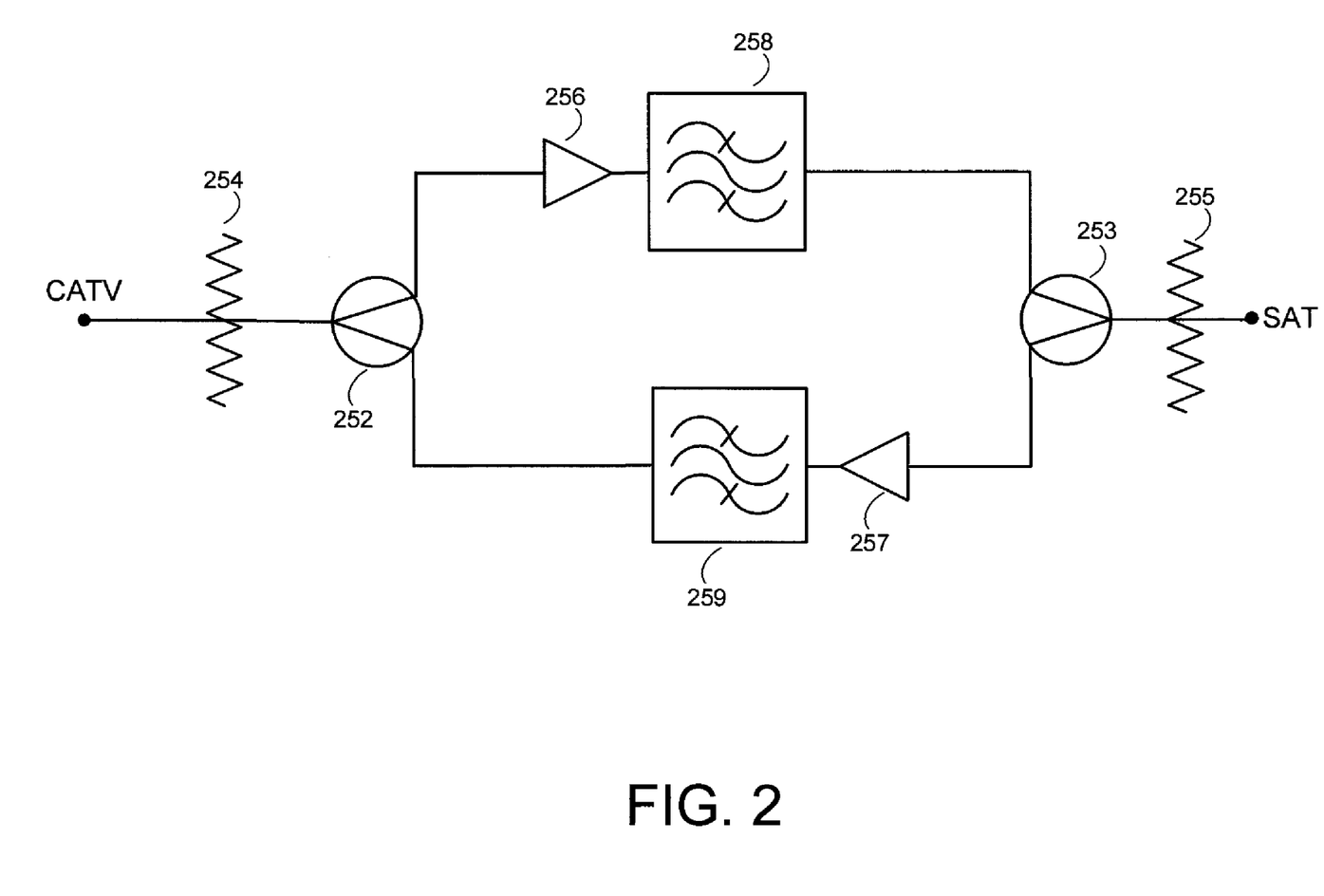
FIG. 2 is diagram of an RF bridge with no frequency translation providing a signal path between the CATV and SAT wiring systems in accordance with the present invention.

FIG. 2 shows an RF bridge in accordance with the present invention. A connection is made to one wiring system and passed through a band pass filter 258 and 259 before connecting the signal to the other wiring system. The band pass filters reject the normal video program frequencies present in each wiring system and pass the common network frequency band. Amplifiers 257 and 257 may be present in the signal path to compensate for the loss of the band pass filters and to balance power. Resistive pad 254 and 255 may be included to provide an improved impedance match and increase isolation between the two paths in the bridge. Couplers 252 and 253 function as signal splitters and combiners. Couplers 252 and 253 preferably are directional to provide attenuation between the two amplifier/filter paths while passing the signal through to the cable. The couplers can be implemented with directional splitters/combiners or isolators. The isolation of the couplers is greater than the gain through the loop to prevent oscillations.

An alternative embodiment of an RF bridge can use a passive band pass filter connected directly between the two wiring systems. This provides a bidirectional signal path for the common network band frequencies and blocking of the conventional cable signal.

Figure 3:
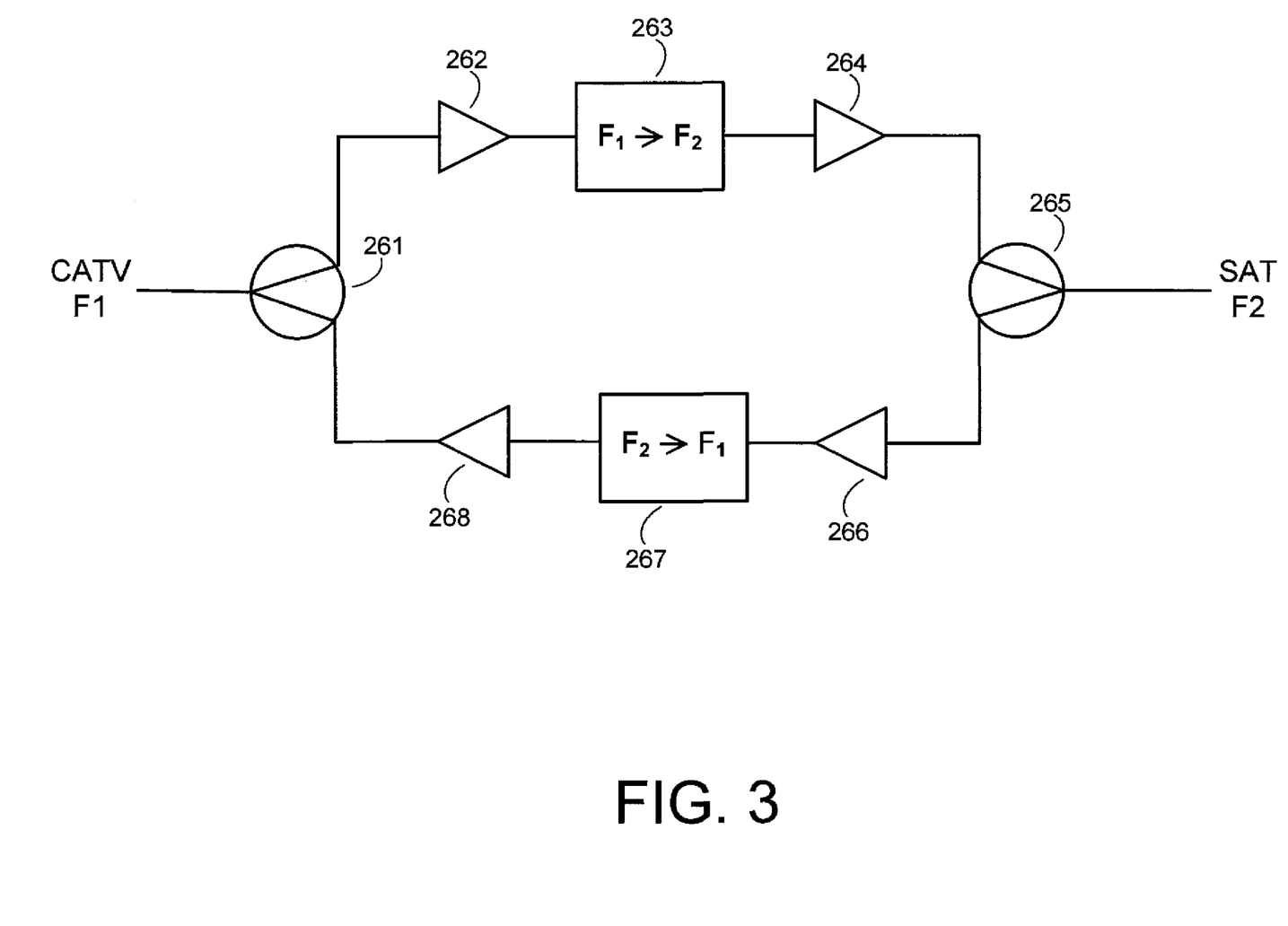
FIG. 3 is diagram of a RF bridge with frequency translation providing a signal path between the CATV and SAT wiring systems in accordance with the present invention.

FIG. 3 shows a frequency translating RF bridge in accordance with the present invention. A connection is made to one wiring system and passed through a band pass filter, mixer, and another band pass filter before connecting the signal to the other wiring system. A frequency translator, also referred to as an up converter or down converter, is shown in more detail in FIG. 6. Two paths are provided for signals coming to and from each wiring system.

Coupler 261 passes CATV signal at frequency 1 to amplifier 262; the signal is converted to frequency 2 by frequency translator 263, amplifier 264 boost the signal, and coupler 265 passes the signal to the SAT wiring. Amplifier 266, frequency translator 267 and amplifier 268 perform the frequency translation from frequency 2 on the SAT wiring to frequency 1 on the CATV wiring. The couplers provide directional isolation to prevent the signal from recirculating and forming an oscillatory condition.

Figure 4:
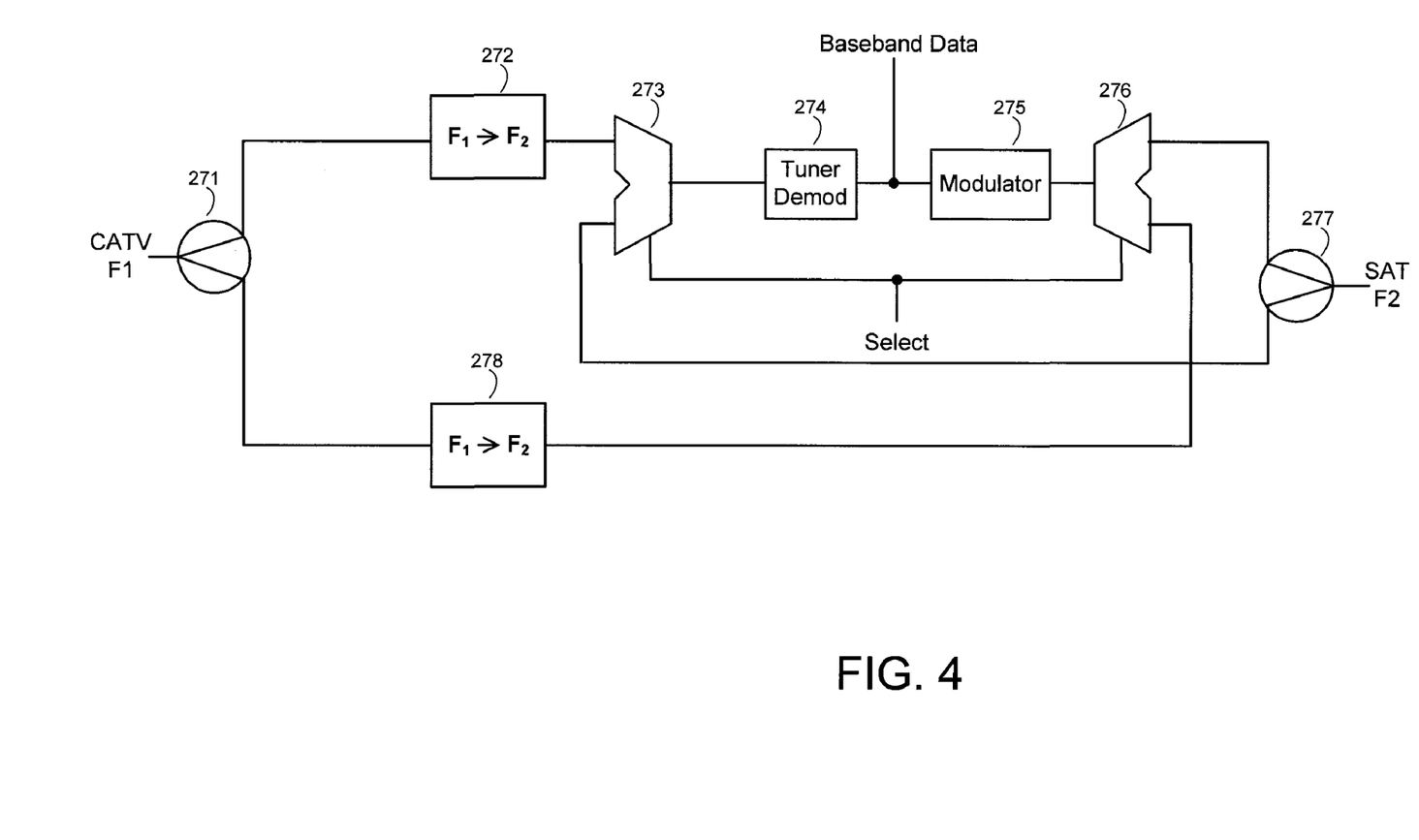
FIG. 4 is a diagram of a base band digital bridge providing a signal path between the CATV and SAT wiring systems in accordance with the present invention.

FIG. 4 shows a digital bridge in accordance with the present invention. A connection is made to the CATV wiring system though coupler 271; frequency translator 272 shift the spectrum to the frequency used on the SAT wiring. Selector 273 selects between the signal on the CATV and SAT wiring to drive tuner/demodulator 274, which demodulates the network signal. Base band data is available at the demodulator output. The base band data is modulated and up converted by modulator 275. Selector 287 selects the wiring system on which the signal will be transmitted. The signal passed to the SAT wiring system through coupler 277 and to the CATV wiring system through frequency translator 278. Data selectors 273 and 276 select the signal source and destination for the demodulator 274 and modulator 275; this enables the data to flow in either direction. Data may be tapped off at the base band point, or injected at the base band point. The base band processing done by the demodulator and modulator can include error correction and framing regeneration.

A second demodulator and modulator can be used to provide simultaneous communication in both directions allowing for full duplex communication.

Figure 5:
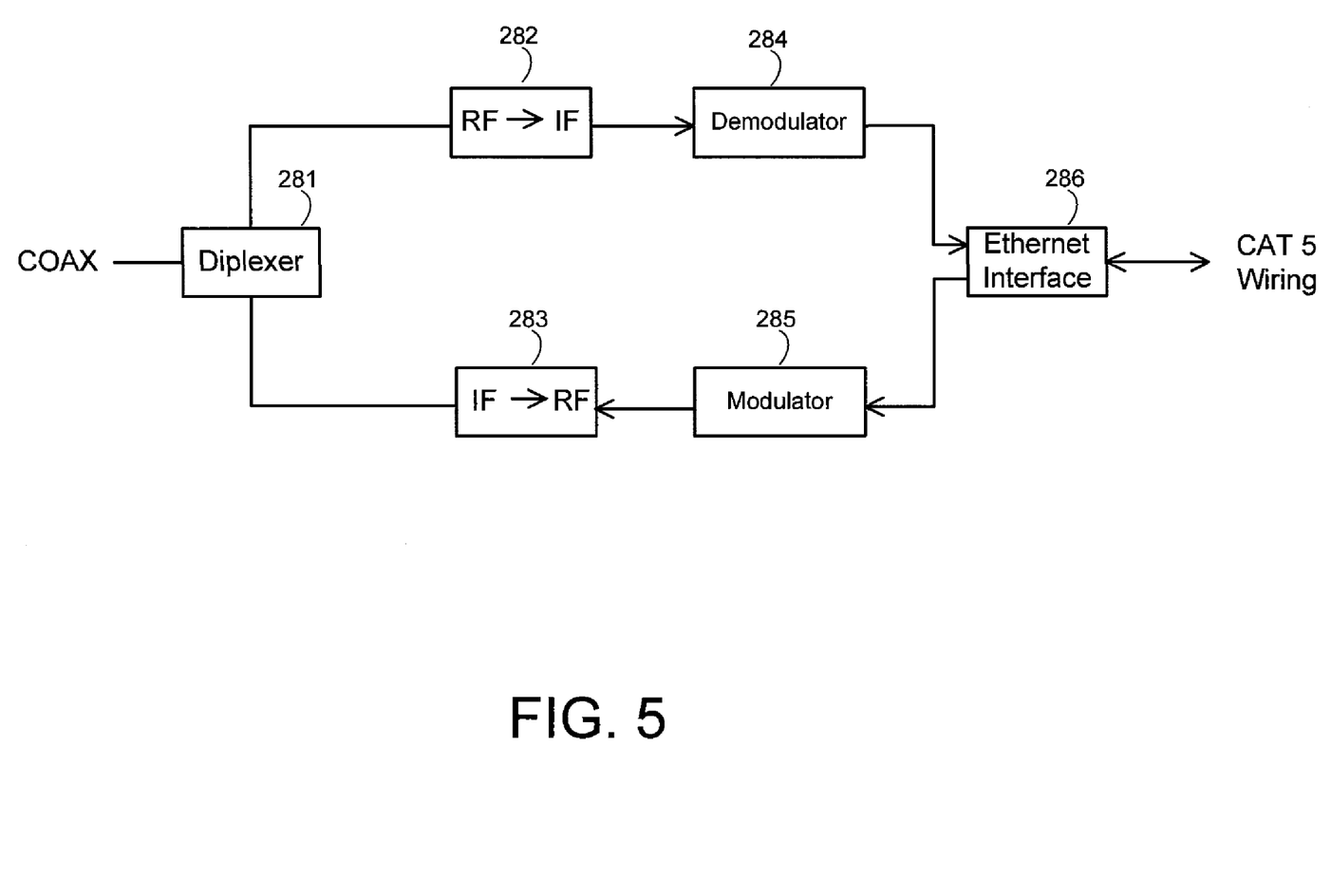
FIG. 5 is a diagram of a bridge providing a communication path between a coaxial wiring system and a CAT5 wiring system in accordance with the present invention.

FIG. 5 shows a digital bridge connecting a coax wiring system to a CAT 5 wiring system. Diplexer 281, which can be a directional coupler, provides a signal to a down converter 282 and demodulator 284 to produce a base band digital signal suitable for connection to the Ethernet interface 286. The signal processing in the demodulator may include error correction, framing, and protocol conversion and router functions. After data is converted to base band digital data, it can be provided to the Ethernet interface 286 and transmitted on CAT 5 wiring. Ethernet data is modulated and unconverted to the network frequency and passed to the coax wiring through diplexer 281. The Ethernet interface is well known in the art and provides all the physical layer and protocol layer processing in order to extract data and to transmit data.

Ethernet interface 286 is representative of other common network interfaces that can be used with the present invention. Other examples include IEEE-1394 communications bus and IEEE-802.11 wireless LAN.

Figure 6:
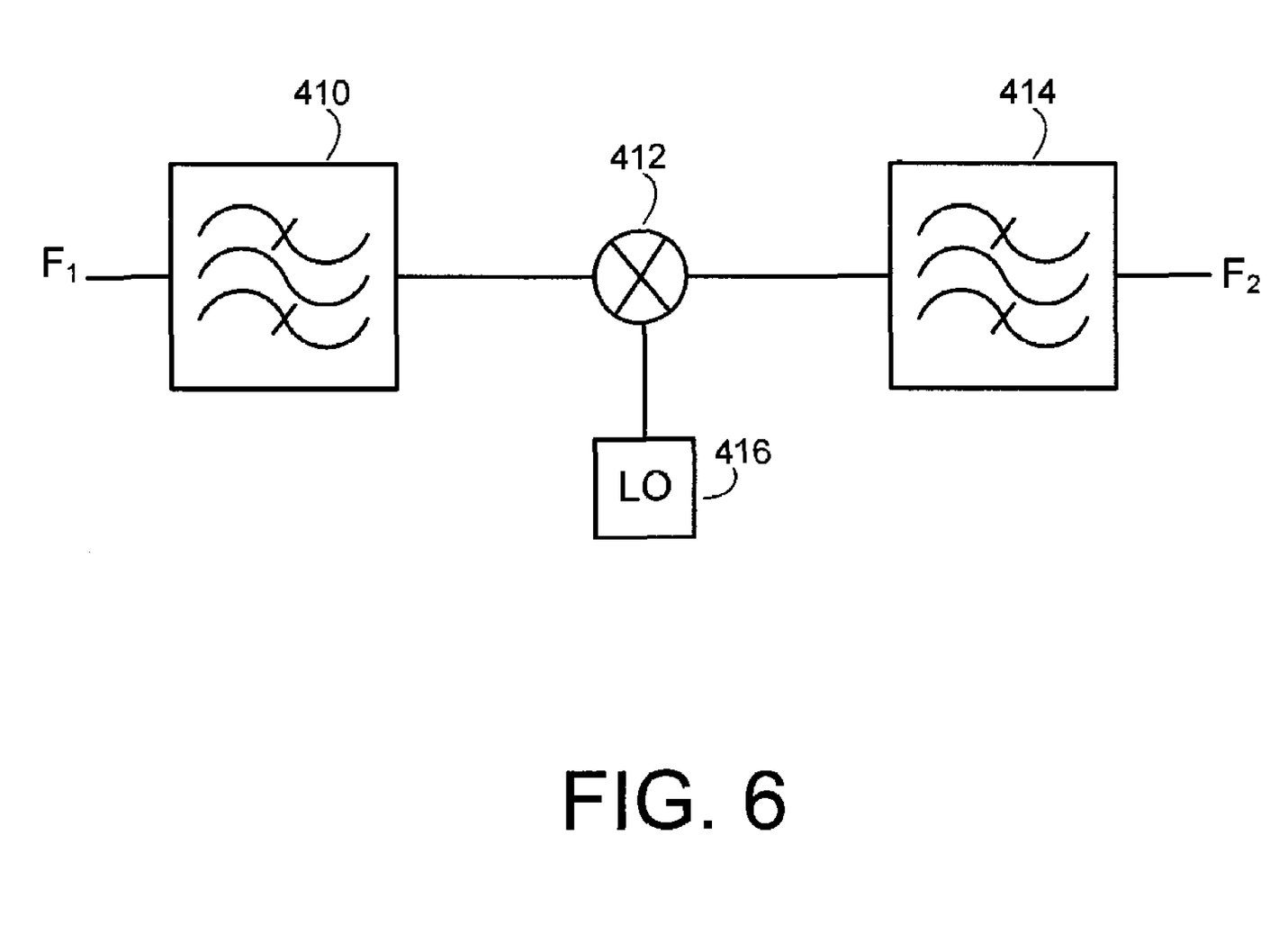
FIG. 6 is a diagram of a frequency up converter and down converter usable with the present invention.

FIG. 6 shows a general purpose frequency translator. Band pass filter 410 selects the band of interest to feed the mixer 412 that shifts the frequency by an amount determined by the LO frequency output by LO 416. LO 416 can be a fixed frequency or adjustable. The second band pass filter 414 selects the band of interest and rejects the unwanted mixer terms. F2 is a copy of the signal band at F1 shifted to a new frequency. Filters 410 and 414 can be low pass, band pass, or high pass filters depending on the frequency plan used for the network and the existing services used on wiring systems.

Figure 7:
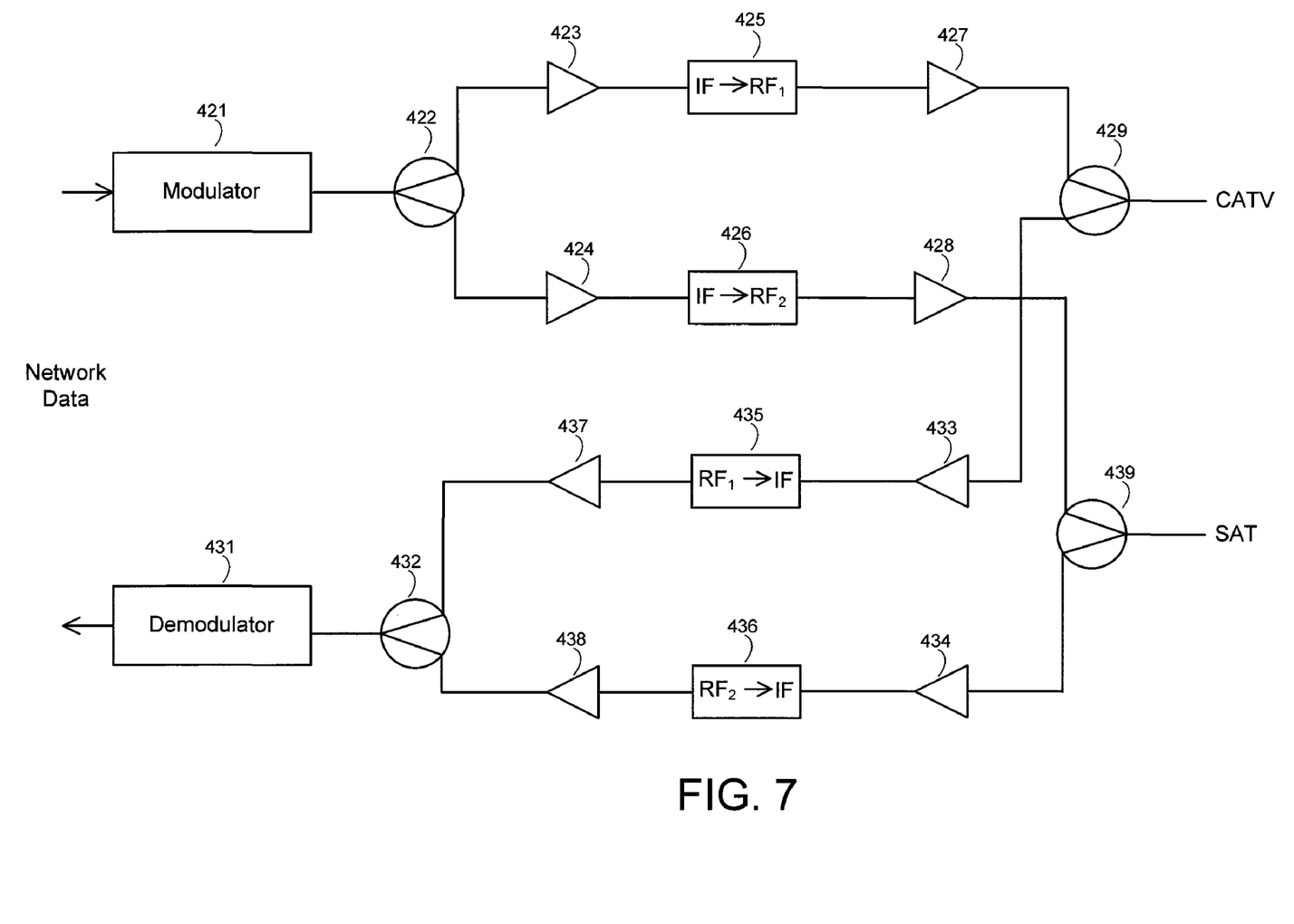
FIG. 7 is a diagram of an alternate embodiment of a base band digital bridge providing a signal path between the CATV and SAT wiring systems in accordance with the present invention.

FIG. 7 is a diagram of a simultaneous physical layer connection between two wiring systems. All data from either wiring system is available at the modulator 421 or demodulator 431, which interface to a network data device, not shown. Splitter 422 drives a path from the modulator to each wiring system comprising amplifiers 423 and 424, frequency translators 425 and 426, and amplifiers 427 and 428. The frequency translation in each path is set according to the frequency used for network signaling in the respective wiring system. Couplers 429 and 439 couple the signal to the wiring. Two signal paths drive demodulator 431 from either wiring system. Amplifiers 433 and 434, frequency translators 435 and 436, and amplifiers 437 and 438 feed into coupler 432. A simple coupler 432 can be used with a time division duplex network protocol when only one network device at a time generates a signal.

Alternatively, the signal from each wiring system can be input to separate demodulators and separate modulators can generate a signal for each wiring system. Baseband signaling can be used that would eliminate the need for frequency translation. A baseband or IF signal can be generated and sampled directly by the modulator and demodulator.

The signaling can use time division duplex (TDD) where each transmission used a different time slot, frequency division duplex (FDD) where transmit and receive are separate frequencies, or frequency division multiplex (FDM) where each user has a different frequency assignment, or a combination of the signaling techniques.

Figure 8:
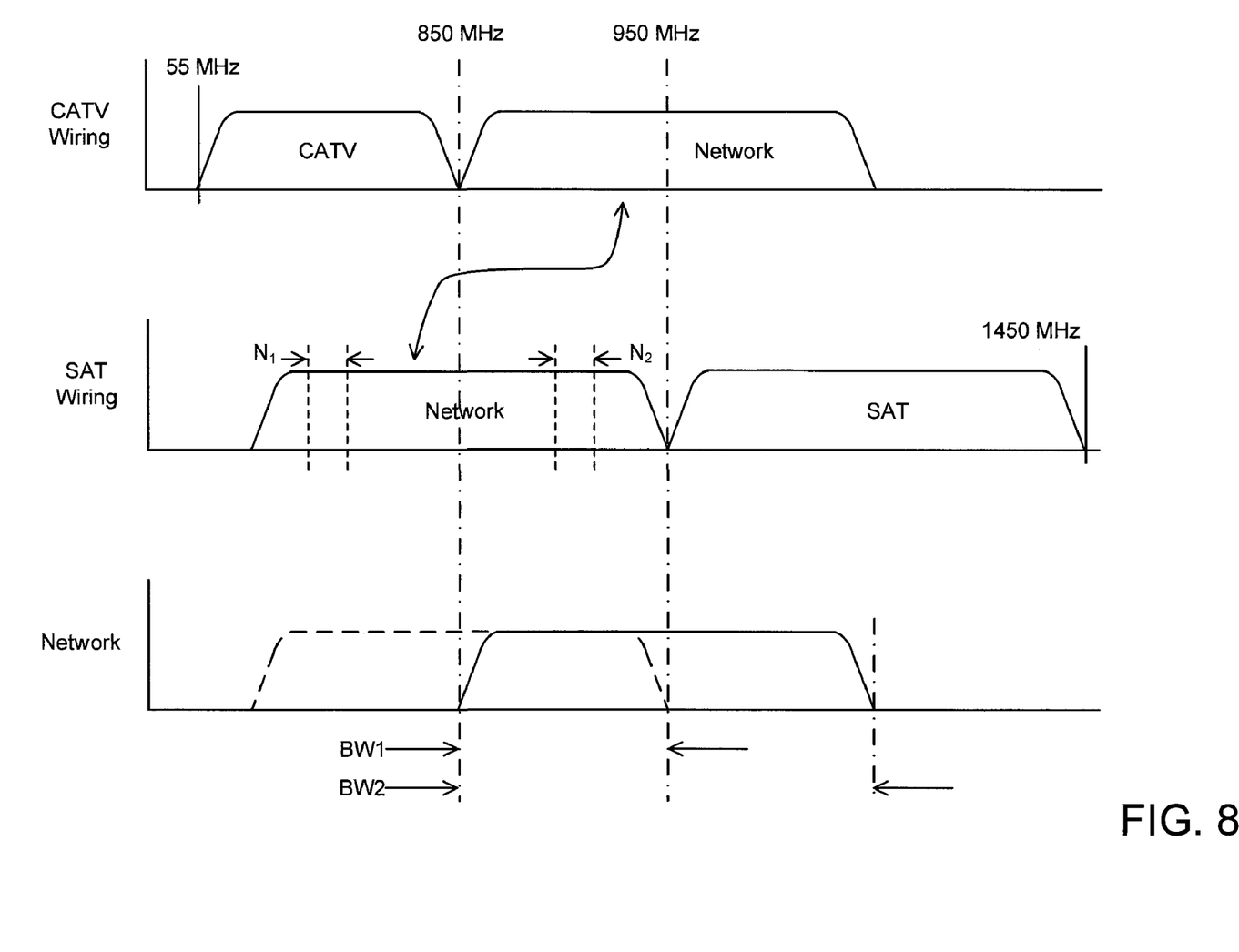
FIG. 8 shows the usage spectrum of CATV and SAT systems along with the usage spectrum of a network in accordance with the present invention.

FIG. 8 shows the frequency spectrum of a CATV and SAT wiring system and frequency spectrum used by the network. In a CATV system, the band above 860 MHz is available. In a SAT system the band below 950 MHz is available. The region between 860 and 950 is available in both systems. If this is adequate bandwidth for the network, no frequency translation is needed. In order to expand the bandwidth available for the network, a wider band can be used on each wiring system and a frequency translation provided to shift the spectrum to a usable region on each system. BW1 represents the bandwidth available in the common unused spectrum of both CATV and SAT systems. BW2 represents the bandwidth available if frequency translation is performed when bridging the network signal from one wiring system to the other.

Several networks each with a different frequency may share the network band. A given home or network may use only part of the network band. Bands N1 and N2 represent a subset of the network band.

The present invention allows the network band to reside at any frequency on the cable and different frequencies on each cable system. The network band can be located within the CATV band at unused frequencies. The network can use frequencies below 55 MHz if available.

Figure 9:
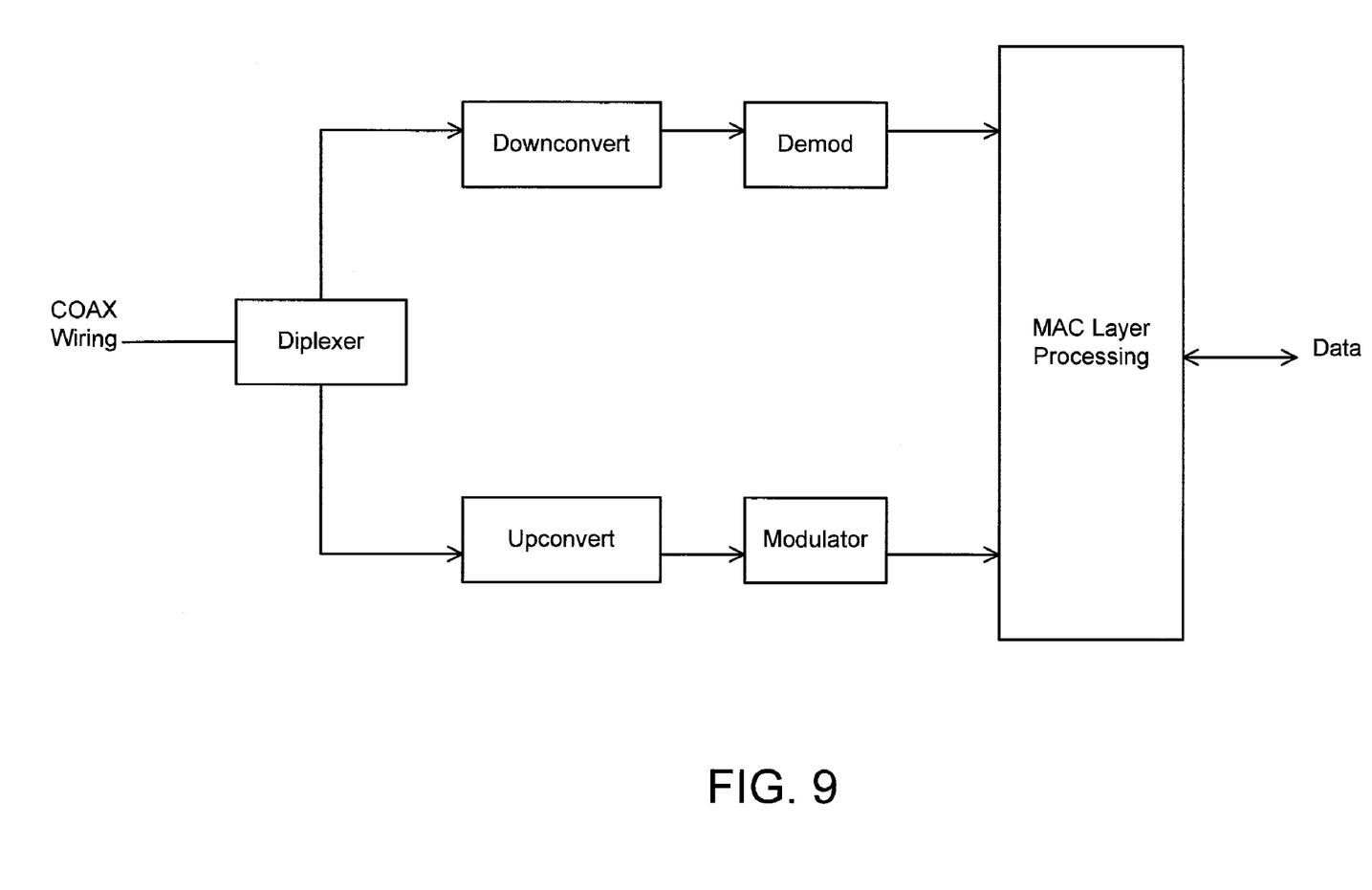
FIG. 9 is a diagram of a modulator/demodulator (MODEM) that also contains the necessary RF to IF conversions.

FIG. 9 is a diagram of a modulator/demodulator (MODEM) that also contains the necessary RF to IF conversions.

The advantage of the present invention is that the MAC layer and higher layer processing sees one unified network even though the physical layer signals are at different frequencies, and possibly different data rates and modulation types.

Figure 10:
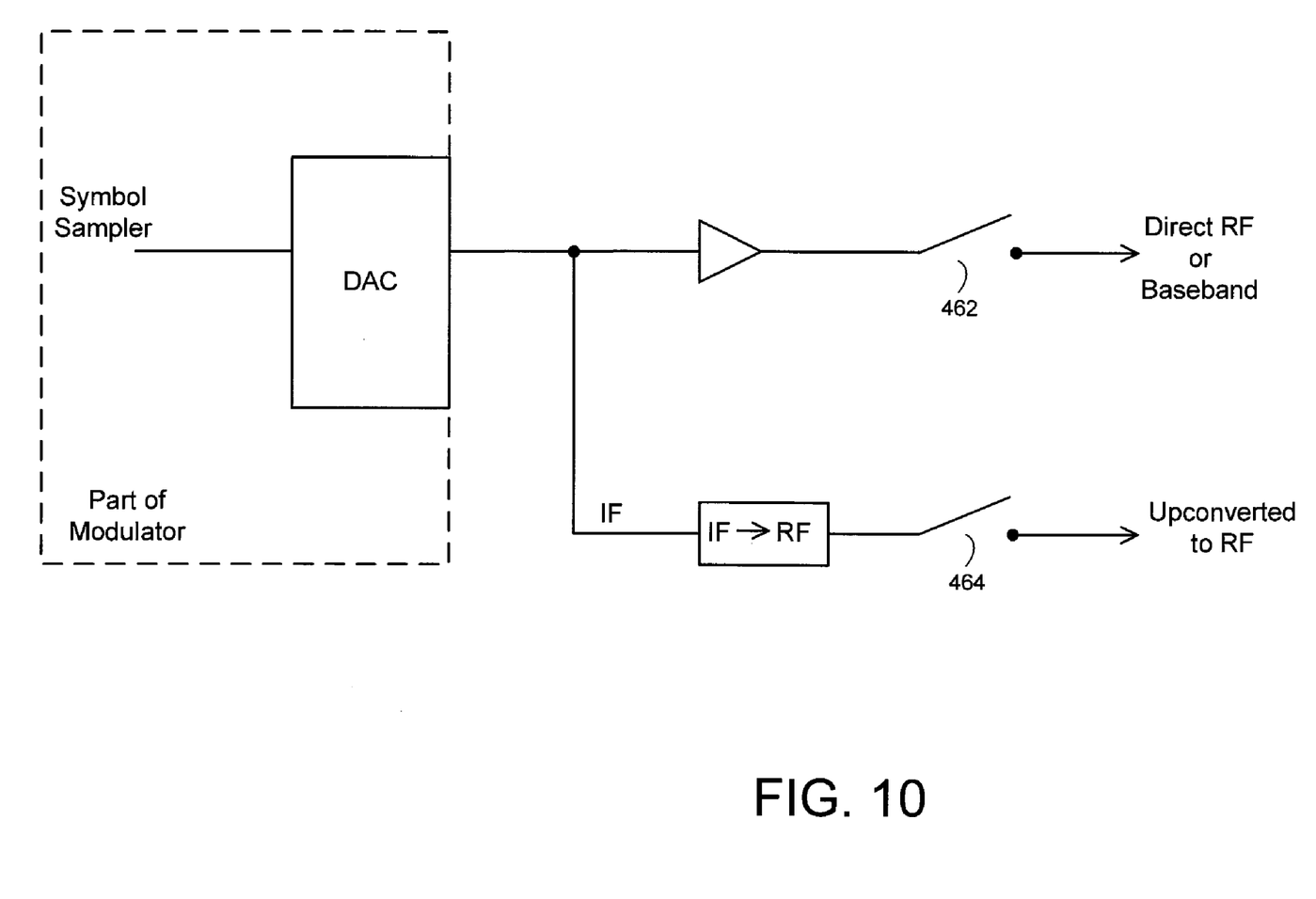
FIG. 10 shows a modulator DAC and output section.

FIG. 10 shows that the modulator DAC may generate the IF or RF signal directly and may be up-converted to the desired RF frequency. RF frequencies above approximately 200 MHz may require frequency up conversion after the DAC. This configuration also allows a baseband signal to be output directly from the DAC to drive one wiring system and simultaneously produce an RF signal to drive another wiring system. Optional switches 462 and 464 allow the signal to be selectively gated onto the wiring. The same principle can be employed to feed a demodulator with an RF signal or down converted to baseband. Switching or coupling supports a simultaneous connection to both wiring systems and the active signal passing to the demodulator.

Figure 11:
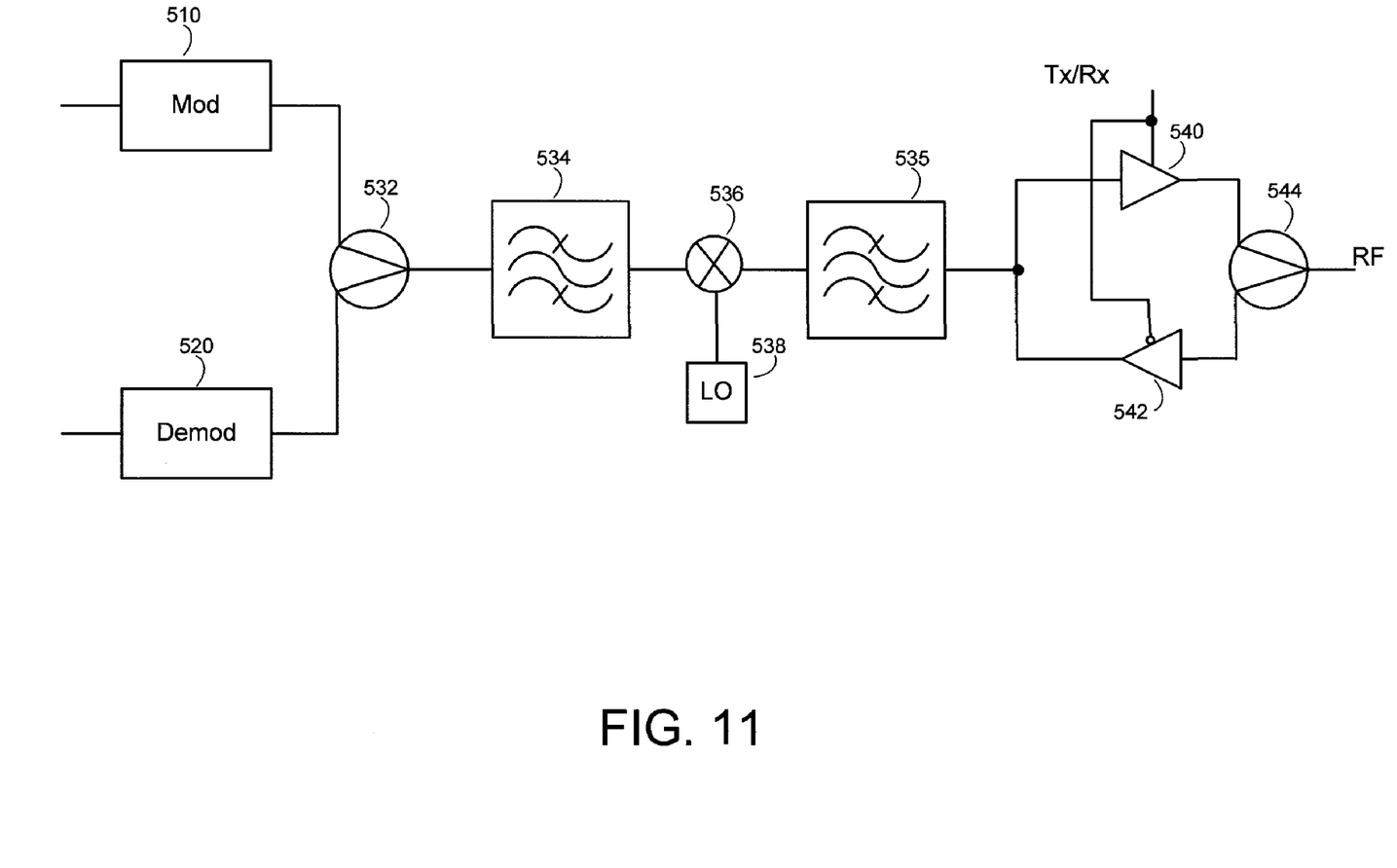
FIG. 11 shows a MODEM and frequency translator in accordance with the present invention.

FIG. 11 shows a modulator 510 and demodulator 520 connected through coupler 532 to band pass filter 534, mixer 536, and band pass filter 535. LO 538 drives mixer 536 to perform a frequency translation of the signal passing through mixer 536. Band pass filters 534 and 535 and mixer 536 are passive devices and therefore can pass signals either direction. Gated amplifiers 540 and 542 connect to coupler 544 and are alternately enabled by TX/RX control. Frequency translation will occur between coupler 532 and coupler 544 to translate the RF signal to and from the modulator and demodulator signal IF frequency. A single frequency translator is used to up convert the transmitted signal and down convert the received signal. For use as an RF bridge the signal would be tapped from filter 534.

The CATV and SAT data network may use the same or different frequencies. They may use the same or different modulation types. These choices are made based on the available signal to noise ratio (SNR) and available bandwidth.

A dynamic discovery method can be used to probe the channel to determine other users on the network and the channel characteristics such as SNR and multipath. Modulation type, level, and power are determined from the information derived from the probing process. A probe message transmits a known symbol sequence that can be compared at the receiver with the expected sequence to determine the channel characteristics. Information about impairments to the channel is used to adapt the transmitted waveform to improve the signal quality at the receiver.

Different networks in different homes can use different regions of the network band in order to avoid interference with each other.

What is claimed is:

1. A communication network operating in a building with first and second coaxial wiring systems comprising splitters and terminal devices and distributing video programming signals, the communication network using frequency regions not used by the video programming signals comprising:

a bridging device with two signal ports, each signal port connected to a different coaxial wiring system; the bridging device comprising a means for transferring network signals between the first coaxial wiring system and the second coaxial wiring system; and a plurality of network devices coupled to the wiring systems, each network device capable of communicating with other network devices;

wherein the bridging device comprises:

a first filter that passes network signals and blocks video program signals on the first coaxial wiring system;

a second filter that passes network signals and blocks video program signals on the second coaxial wiring system;

a first signal coupler receiving a signal from the first wiring system and directing the signal to the first filter, and accepting a signal from the second filter and directing the signal to the first wiring system; and a second signal coupler receiving a signal from the second wiring system and directing the signal to the second filter, and accepting a signal from the first filter and directing the signal to the second wiring system.

2. The communication network of claim 1 further comprising a frequency translator connected between the first filter and the first coupler and a frequency translator connected between the second filter and the second coupler, whereby the network signal passed from one wiring system to the other wiring system is translated to a different frequency.

3. The communication network of claim 2 wherein the first and second filters are band pass filters.

* * * * *